No. 856,471. PATENTED JUNE 11, 1907.
C. J. KIRKEBERG.
HARROW ATTACHMENT FOR CORN CULTIVATORS.
APPLICATION FILED JAN. 19, 1904.
2 SHEETS—SHEET 1.
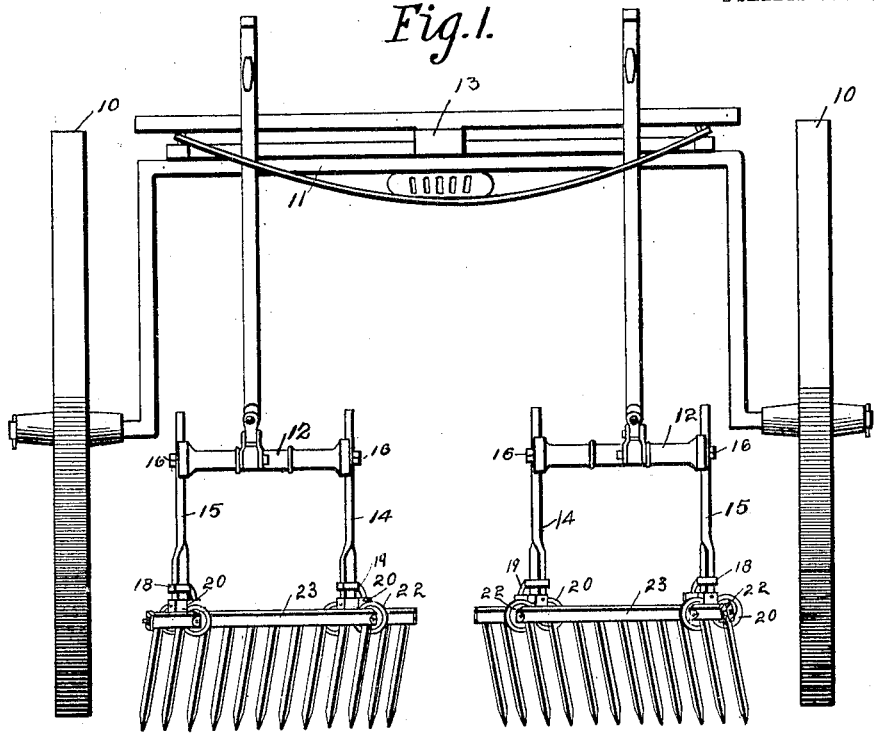
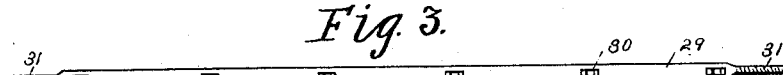
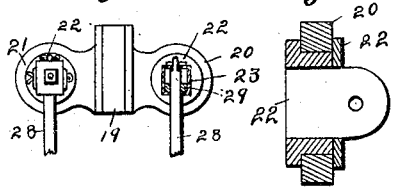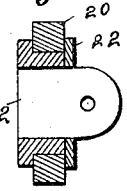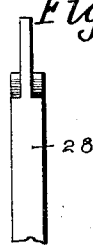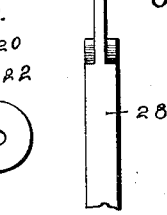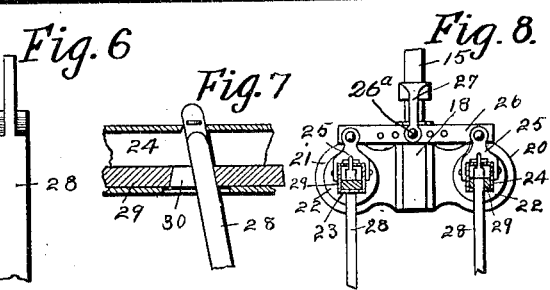
Witnesses,
K. K. Keffer.
S. F. Christy.
Inventor, C. J. Kirkeberg
by Onwig & Lane Att'ys No. 856,471. PATENTED JUNE 11, 1907.
C. J. KIRKEBERG.
HARROW ATTACHMENT FOR CORN CULTIVATORS.
APPLICATION FILED JAN. 19, 1904.
2 SHEETS—SHEET 2.
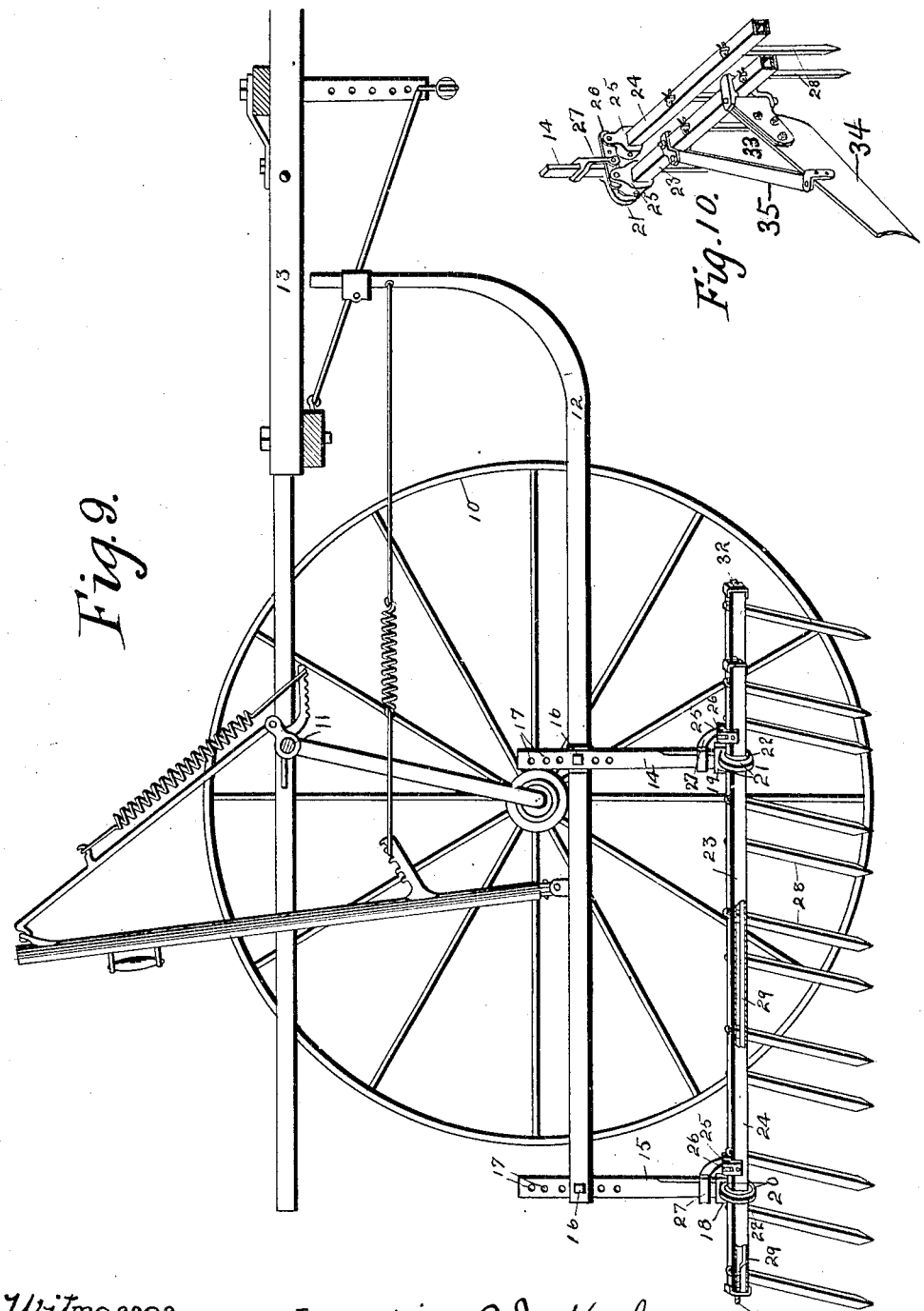
Witnesses,
K. K. Keffer.
S. F. Christy.
Inventor, C. J. Kirkeberg
by Ourig & Lane Att'ys

UNITED STATES PATENT OFFICE.

CARL J. KIRKEBERG, OF EAGLE GROVE, IOWA.

HARROW ATTACHMENT FOR CORN-CULTIVATORS.

No. 856,471.  Specification of Letters Patent.  Patented June 11, 1907.

Application filed January 19, 1904. Serial No. 189,774.

*To all whom it may concern:*

Be it known that I, CARL J. KIRKEBERG, a citizen of the United States, residing in Eagle Grove, in the county of Wright, in the State of Iowa, have invented a certain new and useful Harrow Attachment for Corn-Cultivators, of which the following is a specification.

The object of my invention is to provide a harrow attachment for the ordinary corn cultivators or plows which can be easily and readily attached to the ordinary cultivator frame and is designed to take the place, to a large extent, of the shovels now in use on cultivators.

A further object is to provide a harrow attachment for cultivators, the teeth in which can be readily and easily adjusted so that they will be inclined forwardly or rearwardly relative to their pivotal points of attachment or inclined to the right or left of their pivotal points of attachment.

A further object is to provide a cultivator attachment in which the parts can be readily adjusted to prevent the earth being thrown against the rows of corn and also to prevent the cutting of the roots as the cultivator is drawn over the ground surface.

My invention consists in certain details, in the construction, arrangement and combination of the various parts of the device, whereby the objects contemplated, are attained, as hereinafter more fully set forth, pointed out in my claims and illustrated in the accompanying drawings, in which—

Figure 1 is a rear elevation of my attachments, showing the way in which they are connected to the ordinary cultivator frame. Fig. 2 shows, in perspective, one of the harrow attachments with the supporting bars for attaching it to the cultivator frame broken away. Fig. 3 is a detail view of the adjusting rod for swinging the teeth longitudinally of the frame. Fig. 4 is a rear elevation of a portion of the cultivator frame, showing the position of one of the shells in which the teeth are mounted and also shows in cross section the other of said shells which is prevalent in each section and the way of mounting said teeth. The lower portion of the teeth are broken away in this view. Fig. 5 is a sectional view of a portion of the device for maintaining the shells in position after the teeth have been swung to the right or left of their pivotal attachment. Fig. 6 is a detail view of the upper portion of one of the teeth. Fig. 7 is a detail, sectional view, showing the shell and the way in which the teeth are mounted in the shell and a portion of the adjusting rod for moving the teeth forwardly or rearwardly relative to their pivotal points of attachment. Fig. 8 is a cross sectional view of one of my attachments, showing the way in which the teeth are mounted in the shells. Fig. 9 is a sectional view cut through the central portion of the frame of the machine, showing the inside of one of my attachments and the way in which said attachment is mounted on the cultivator frame, and Fig. 10 is a detail view of a portion of one of the harrow attachments showing the hilling device attached to it.

Referring to the accompanying drawings, I have used the reference numeral 10 to indicate the wheels of the cultivator to which my attachments are connected. The numeral 11 to indicate the connecting support between the wheels. Attached to and depending from the connecting support 11 is the cultivator beam 12, one of which is on each side of the cultivator as is customary in the ordinary machine of this class, both of said beams being mounted between the wheels. Throughout the entire specification I have referred simply to one of my attachments, although there may be two or more on each cultivator, depending on the number of beams which the cultivator has and the number of rows which are to be cultivated by the cultivator. The construction of my attachments are alike throughout except one is adapted for one side of a row of corn while the other is adapted for the other, the construction being the same. My attachments are to be used in the same way that the ordinary shovels are used; that is the wheels are to pass between the rows of corn and one of the harrow attachments is to be drawn on one side of the row and another on the opposite side of the row as the cultivator is drawn forwardly. Attached to and extending forwardly from the connecting support 11 is the ordinary tongue 13. Detachably connected with one of the beams 12 of the cultivator frame are the supporting bars 14 and 15. Said supporting bars are maintained in position relative to the beam 12 by means of the bolts 16 which are designed to pass through openings in the bars 17 and in the bars 14 and 15. Detchably connected with the lower end of each of said bars 14 and 15 are the shell supporting portions 18 and 19. At each side of the bar 15 and forming the ends of the shell supporting portions 18 and 19 are the circular portions 20 and 21, each of which has a circular opening extending through it. Rotatably mounted in each of these circular openings is a guide 22 having the square opening in its central portion. Extending through the square openings which are on the same side of the supporting portions 18 and 19 is the toothed supporting shell 23 extending through the square openings on the opposite sides of the shell supporting member 18 from that on which the shell 23 is mounted is a similar shell 24. Mounted at the top of each of the shells 23 and 24 and immediately in front of each of the shell supporting portions 18 and 19 are the substantially U-shaped lugs 25. Connecting these lugs 25 and pivotally attached to each of them is the link 26. Pivotally and adjustably attached to the central portion of said link 26 by means of the bolt 26ª is the arm 27 which is slidingly mounted at its upper end on the supporting bar 15. It will be seen that as the link 26 is moved to the right or left by swinging the teeth after first removing the bolt 26ª, the shells 23 and 24 will be swung to the right or left and the parts 22 will be rotated in the circular openings in the circular parts 20 and 21, and the teeth and shells will be held in that position by engagement with the bolt 26ª inserted in one of the openings in link 26 to the right or left of the central one. There is a similar mechanism for maintaining the shells 23 and 24 in position relative to the part 14, connected with the shell supporting portion 19 and attached to it in the same way as that connected with the support 15.

Pivotally attached to each of the shells 23 and 24 and extending through them is a series of teeth 28. Each of these teeth are pivotally attached to the upper side of the shells 23 and 24 by pins overlying said shells; said teeth extending downwardly through the upper portion of the shell and through the lower portion thereof, the opening which admits the teeth through the lower portion of the shell being longer than that through the upper portion of the shell, so that the teeth are capable of being swung on their pivot in the openings at the bottom portion of the shell. Extending longitudinally of the shell between the upper and lower portions thereof is an adjusting rod having a series of slots 30 therein through which the teeth 28 are designed to pass. There is a screw threaded portion 31 at each end of this adjusting rod 29 having a nut 32 mounted on said screw threaded portion. The nuts are designed to engage the ends of the shells 23 as one of the nuts 32 is unscrewed and the other screwed up. As this is done, the teeth 28 which are pivotally attached to the shell 23 are swung on their pivots and inclined rearwardly or forwardly relative to their pivotal points of attachment to the part 23 and maintained in the desired position. There is a similar adjusting rod extending through the shell 24, which is operated in the same manner as the adjusting rod 29 and for the same purpose. By the above described arrangement of parts, the teeth can be set in the desired position for use before the operation of cultivating commences, and that will be maintained in this position during the time they are used until readjusted by the operator. The ease with which the teeth are tilted either at the right or left of their pivotal points of attachment to the shells or to the front or rear of said pivotal points of attachment and maintained in the desired position is of great advantage owing to the simplicity and ease with which these parts may be adjusted, and the advantage which is gained by placing the teeth at a desired angle prior to starting the cultivator is of great advantage, particularly as the teeth can be tilted in the ways above described.

I have also provided a hiller 33 comprising a blade 34 which is secured at its inner end to the supporting shell 23 and a brace rod 35 connected at its outer end to the blade 34 and also secured at its inner end to the supporting shell 23; said hiller as a whole can be attached to or detached from the shell to which the teeth are attached.

Having thus described my invention, what I claim and desire to secure by Letters Patent of the United States, therefor is—

1. In a cultivator frame, a harrow attachment connected with said frame, comprising shells, teeth pivotally attached to the shells, an adjusting rod extending longitudinally of each of the shells through which each tooth passes, means for moving each of said adjusting rods longitudinally of each shell, means for rotatably supporting the shells relative to the frame, means for maintaining the shells in position against rotation, and a hiller connected with the shells.

2. In a device of the class described, the combination of two teeth bearing portions arranged diagonally across the line of advance of the machine to which it is attached, teeth pivoted to said portions, adjusting rods extending longitudinally of the teeth bearing portions for inclining said teeth forwardly and rearwardly relative to their pivotal points of attachment to the teeth bearing portions, adjustable means for maintaining the teeth at various inclinations to the right or left of their pivotal points of attachments, and supporting bars detachably connected with the teeth bearing portions and capable of being connected with the frame of the cultivator.

CARL J. KIRKEBERG.

Witnesses:
 WILFRED C. LANE,
 W. R. LANE.